United States Patent
Lundberg et al.

(10) Patent No.: US 9,383,003 B2
(45) Date of Patent: Jul. 5, 2016

(54) HYDRAULIC CONTROL SYSTEM FOR A CONTINUOUSLY VARIABLE TRANSMISSION

(71) Applicant: GM Global Technology Operations LLC, Detroit, MI (US)

(72) Inventors: Philip C. Lundberg, Keego Harbor, MI (US); Zhe Xie, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 532 days.

(21) Appl. No.: 13/906,696

(22) Filed: May 31, 2013

(65) Prior Publication Data

US 2013/0333508 A1 Dec. 19, 2013

Related U.S. Application Data

(60) Provisional application No. 61/661,130, filed on Jun. 18, 2012.

(51) Int. Cl.
*F16D 31/02* (2006.01)
*F16H 61/00* (2006.01)
*F16H 57/04* (2010.01)
*F16H 61/664* (2006.01)

(52) U.S. Cl.
CPC ........ *F16H 61/0021* (2013.01); *F16H 57/0435* (2013.01); *F16H 61/6648* (2013.01); *F16H 61/6649* (2013.01); *F16H 2061/0037* (2013.01); *Y10T 74/20024* (2015.01); *Y10T 137/85978* (2015.04)

(58) Field of Classification Search
CPC ........................ F16H 57/0435; F16H 57/0446
See application file for complete search history.

(56) References Cited

U.S. PATENT DOCUMENTS

| | | | |
|---|---|---|---|
| 7,513,226 B2 | 4/2009 | Swain et al. | |
| 8,069,661 B2 | 12/2011 | Hendrickson et al. | |
| 8,225,687 B2 | 7/2012 | Lundberg et al. | |
| 8,234,946 B2 | 8/2012 | Momal et al. | |
| 8,356,529 B2 | 1/2013 | Lundberg et al. | |
| 8,359,941 B2 | 1/2013 | Lundberg et al. | |
| 8,375,710 B2 | 2/2013 | Mellet et al. | |
| 8,382,626 B2 | 2/2013 | Moorman et al. | |
| 8,402,855 B2 | 3/2013 | Lundberg et al. | |
| 8,403,792 B2 | 3/2013 | Lundberg et al. | |
| 8,403,793 B2 | 3/2013 | Moorman et al. | |
| 8,413,437 B2 | 4/2013 | Ghike et al. | |
| 8,429,994 B2 | 4/2013 | Lundberg et al. | |
| 8,435,148 B2 | 5/2013 | Moorman | |
| 8,443,687 B2 | 5/2013 | Moorman | |
| 8,464,851 B2 | 6/2013 | Moorman | |
| 8,475,336 B2 | 7/2013 | Whitmarsh et al. | |
| 8,500,600 B2 | 8/2013 | Moorman | |
| 8,567,580 B2 | 10/2013 | Czoykowski et al. | |
| 8,568,262 B2 | 10/2013 | Moorman et al. | |
| 8,579,094 B2 | 11/2013 | Moorman et al. | |
| 8,579,753 B2 | 11/2013 | Heitzenrater et al. | |

(Continued)

*Primary Examiner* — Michael Leslie

(57) ABSTRACT

A hydraulic control system for a continuously variable transmission includes a pressure regulator subsystem, a ratio control subsystem, a torque converter control (TCC) subsystem, a variable lubrication control subsystem, a variator clamping subsystem, and a clutch control subsystem. The variable lubrication control subsystem allows for increased and decreased oil flow to components of the variable transmission based on demand. The pressure regulator subsystem provides binary line pressure control to the lubrication subsystem.

19 Claims, 2 Drawing Sheets

(56) References Cited

U.S. PATENT DOCUMENTS

| | | |
|---|---|---|
| 8,591,365 B2 | 11/2013 | Moorman et al. |
| 8,596,294 B2 | 12/2013 | Otanez et al. |
| 8,613,681 B2 | 12/2013 | Sowards et al. |
| 8,636,614 B2 | 1/2014 | Moorman et al. |
| 8,651,990 B2 | 2/2014 | Moorman et al. |
| 8,678,780 B2 | 3/2014 | Dougan et al. |
| 8,702,548 B2 | 4/2014 | Moorman |
| 8,738,257 B2 | 5/2014 | Moorman et al. |
| 2011/0146820 A1 | 6/2011 | Frerichs et al. |
| 2011/0318105 A1 | 12/2011 | Yang |
| 2012/0174570 A1 | 7/2012 | Xie et al. |
| 2012/0174998 A1 | 7/2012 | Grochowski |
| 2013/0118854 A1 | 5/2013 | Eber |
| 2013/0130859 A1 | 5/2013 | Lundberg et al. |
| 2013/0232962 A1 | 9/2013 | Marin et al. |
| 2013/0319155 A1 | 12/2013 | Berger |
| 2013/0324355 A1 | 12/2013 | Xie et al. |
| 2013/0327172 A1 | 12/2013 | Berger et al. |
| 2014/0034437 A1 | 2/2014 | Berger et al. |
| 2014/0038761 A1 | 2/2014 | Xu |
| 2014/0047828 A1 | 2/2014 | Benson et al. |

HYDRAULIC CONTROL SYSTEM FOR A CONTINUOUSLY VARIABLE TRANSMISSION

CROSS-REFERENCE TO RELATED APPLICATIONS

This application claims the benefit of U.S. Provisional Application No. 61/661,130 filed Jun. 18, 2012. The disclosure of the above application is incorporated herein by reference.

TECHNICAL FIELD

The invention relates to a control system for a continuously variable transmission, and more particularly to an electro-hydraulic control system having active lubrication control, clutch control, torque converter control and ratio control for a continuously variable transmission.

BACKGROUND

A typical continuously variable transmission (CVT) includes a hydraulic control system that is employed to provide cooling and lubrication to components within the CVT and to actuate torque transmitting devices such as drive clutches or torque converter clutches, and power roller positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the trunnions that move the power rollers of the CVT. The pressurized hydraulic fluid delivered to the power rollers is used to position the power roller relative to input and output variators in order to obtain different gear ratios.

While previous hydraulic control systems are useful for their intended purpose, the need for new and improved hydraulic control system configurations within CVT's which exhibit improved performance, especially from the standpoints of efficiency, responsiveness and smoothness, is essentially constant. Accordingly, there is a need for an improved, cost-effective hydraulic control system for use in a hydraulically actuated CVT.

SUMMARY

A hydraulic control system for a CVT is provided. The hydraulic control system includes a pressure regulator subsystem, a ratio control subsystem, a torque converter control (TCC) subsystem, a variable lubrication control subsystem, a variator clamping subsystem, and a clutch control subsystem.

In one example, the hydraulic control system includes a source of pressurized hydraulic fluid, a control valve assembly having an inlet, an outlet, and a spool moveable between a first position and a second position, wherein the inlet is in downstream fluid communication with the source of pressurized hydraulic fluid, and wherein spool prevents fluid communication from the inlet to the outlet when in the first position and wherein the spool allows fluid communication from the inlet to the outlet when in the second position, a bypass orifice having a first end in fluid communication with the outlet and a second end in fluid communication with the source of pressurized hydraulic fluid, a lubrication feed line in communication with the outlet and the first end of the bypass orifice, and a variator lubrication circuit in downstream fluid communication with the lubrication feed line.

In one embodiment, the hydraulic control system includes a control solenoid in direct fluid communication with the spool of the control valve, wherein the control solenoid controls the amount of fluid communication between the inlet and the outlet by communicating a pressurized hydraulic fluid signal to act on the spool to move the spool between the first and second positions.

In another embodiment, the control solenoid is a normally high, low flow variable force solenoid.

In yet another embodiment, the control valve assembly includes a signal port that communicates with a first end of the spool, and wherein the control solenoid is in direct fluid communication with the signal port.

In yet another embodiment, the control valve assembly includes a feedback port that communicates with a second end of the spool opposite the first end, and wherein the feedback port is in communication with lubrication feed line.

In yet another embodiment, a high speed gear lubrication circuit is in downstream fluid communication with the lubrication feed line.

In yet another embodiment, the source of pressurized hydraulic fluid includes a pump in upstream fluid communication with a pressure regulator valve assembly, and wherein the inlet is in direct fluid communication with the pressure regulator valve assembly.

In yet another embodiment, the pump includes a first outlet and a second outlet, wherein the first outlet communicates with the control valve assembly through the pressure regulator valve assembly.

In yet another embodiment, the pressure regulator valve assembly includes a first port, a second port, a third port, a fourth port, and a pressure regulator spool moveable between a first position, a second position, and a third position, wherein the first port is in fluid communication with the first outlet of the pump, the second port is in fluid communication with the inlet of the control valve assembly, and the third port is in fluid communication with a suction line, and the forth port is communication with pressure regulator valve assembly 230 and wherein the pressure regulator spool prevents fluid communication from the first port to the second port and third port when in the first position and allows fluid communication between the first port and the second port and fluid communication between the third port and the fourth port port when in the second position. In the second position the second port cannot communicate with the third port. When the valve is in the third position, fluid can communicate between the first port and the second port and the third port and the fourth port.

In yet another embodiment, the suction line communicates with a first and a second inlet of the pump.

In yet another embodiment, the pressure regulator spool is moveable to a third position between the first and second positions, wherein the pressure regulator spool allows fluid communication from the first port to the second port and prevents fluid communication from the first port to the third port when in the third position.

In yet another embodiment, a ratio control subsystem is in direct downstream fluid communication with the second outlet of the pump.

In yet another embodiment, the ratio control subsystem includes a ratio control valve, a trunnion piston, a precess cam, and a stepper motor.

In yet another embodiment, the spool of the control valve assembly is in the first position when the pressure regulator spool is in the second position.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
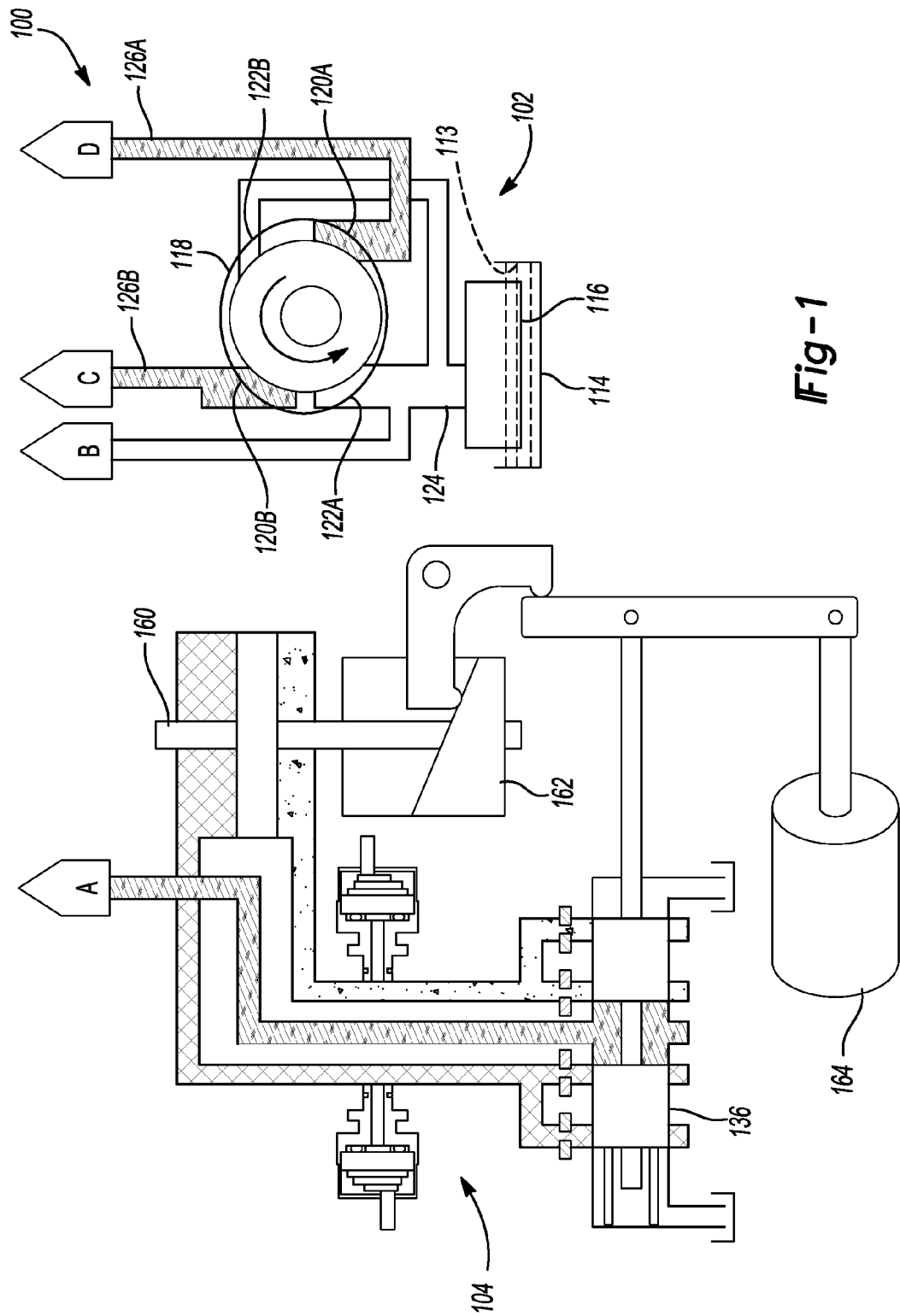
FIG. 1 is a diagram of a portion of a hydraulic control system according to the principles of the present invention.
Figure 2:
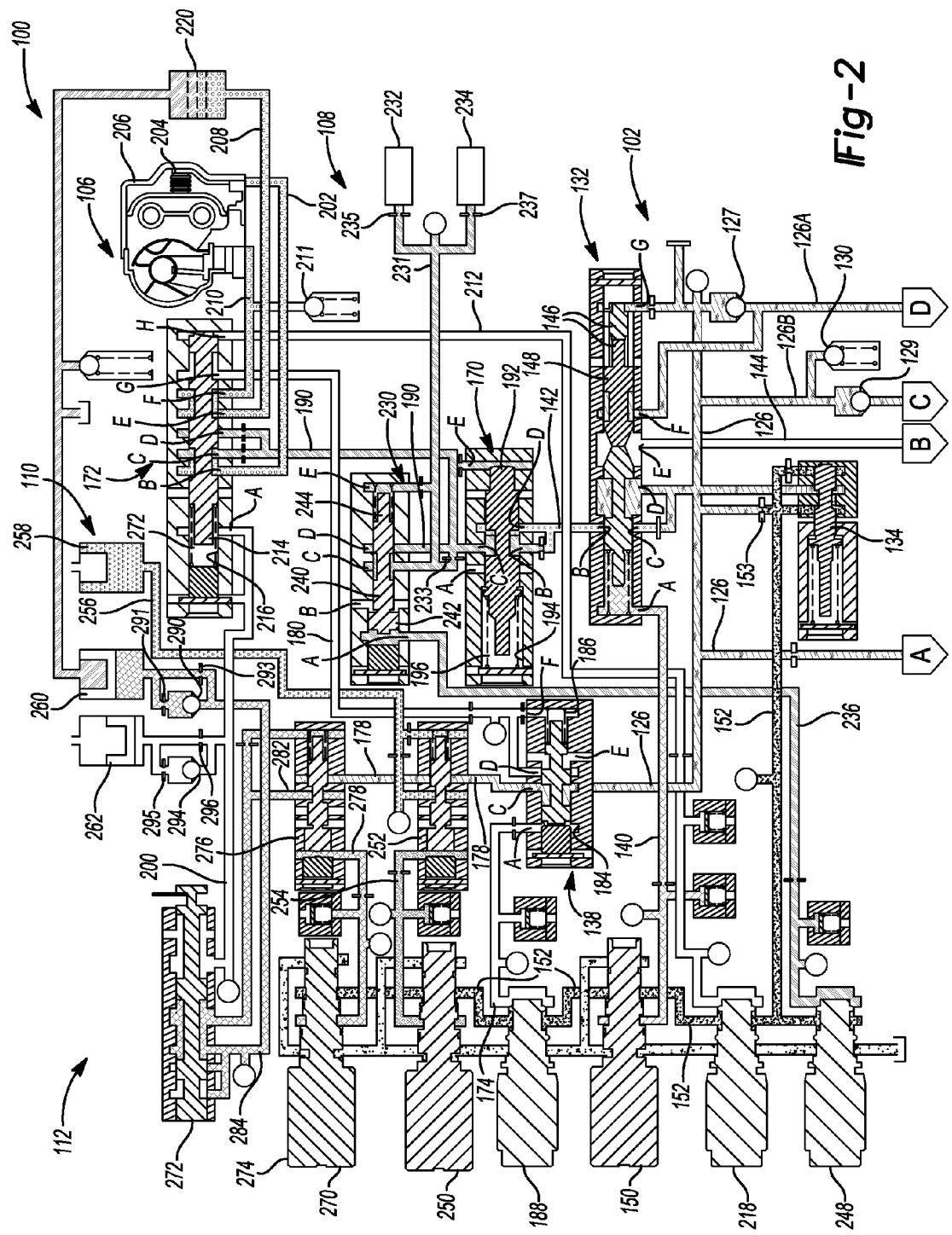
FIG. 2 is a diagram of another portion of the hydraulic control system according to the principles of the present invention.

With combined reference to FIGS. 1 and 2, a hydraulic control system according to the principles of the present invention is generally indicated by reference number 100. The hydraulic control system 100 includes a plurality of interconnected or hydraulically communicating circuits or subsystems including a pressure regulator subsystem 102, a ratio control subsystem 104, a torque converter control (TCC) subsystem 106, a lubrication control subsystem 108, a variator clamping subsystem 110, and a clutch control subsystem 112.

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. In one example, the pump 118 is a binary, balanced vane pump having dual inputs and dual outputs. For example, the pump 118 includes outlet ports 120A and 120B and inlet ports 122A and 122B. The inlet ports 122A and 122B communicate with the sump 114 via a suction line 124. The outlet ports 120A and 120B communicate pressurized hydraulic fluid 113 to a main supply line 126 with branches 126A and 126B through one way valves 127 and 129, respectively. The one-way valves 127 and 129 are used to selectively prevent hydraulic flow into the main pump 118 when the main pump 118 is non-operational.

The main supply line 126 communicates hydraulic fluid from the pump 118 to a spring biased blow-off safety valve 130, a pressure regulator valve 132, an actuator feed limit valve 134, a ratio control valve 136, a TCC regulator valve 138, a loading regulator valve 252 and a clutch regulator valve 276. The safety valve 130 is set at a relatively high predetermined pressure and if the pressure of the hydraulic fluid in the main supply line 126 exceeds this pressure, the safety valve 130 opens momentarily to relieve and reduce the pressure of the hydraulic fluid.

The pressure regulator valve 132 is configured to bleed off pressure from the main supply line 126. The pressure regulator valve 132 includes ports 132A-G. Port 132A is in communication with a signal fluid line 140. Port 132B is in communication with a fluid line 142. Ports 132C, 132D, 132F, and 132G are in communication with the main supply line 126. Port 132E is in fluid communication with a return line 144 that communicates with the sump 114 and pump inlet ports 122A and 122B.

The pressure regulator valve 132 further includes a spool 146 slidably disposed within a bore 148. The spool 146 automatically changes position to dump excess flow from the main supply line 126 to the return line 144 and to the converter feed line 142 until a pressure balance is achieved between a commanded pressure and the actual pressure. The spool 146 moves between a de-stroked position or first position (shown in FIG. 2), a stroked position or second position, and a balanced position or third position between the first and second positions. The spool 146 is modulated by a line pressure control solenoid 150 that communicates with the signal line 140. The line pressure control solenoid 150 receives hydraulic fluid from a solenoid feed line 152 and is preferably a low flow, normally high variable force solenoid. The solenoid 150 commands a fluid pressure by sending pressurized hydraulic fluid to port 132A to act on the spool 146. Simultaneously, fluid pressure from the main fluid line 126 enters port 132G and acts on the opposite side of the spool 146. Pressure balance between the commanded pressure from the solenoid 150, pressure within the main supply line 126 and the spring is achieved as the spool 146 moves to the third position and allows selective communication between port 132F and port 132E, ports 132D and 132E, and ports 132C and 132D, thereby bleeding pressure from the main supply line 126. Half of the pressure from the pump 118 may be unloaded when the spool 146 is stroked and port 132F bleeds fully into port 132E which returns the hydraulic fluid from branch 126A of the main supply line 126 back into the suction line 124. In this operating mode, only hydraulic fluid from branch 126B feeds the main supply line 126. When flow between ports 132D and 132E is blocked by spool 146, both branches 126A and 126B feed the main supply line 126. Lubrication and converter feed lines are preferably fully open to the main supply line 126 when the pump 118 is unloaded (i.e. when branch 126F feeds into the suction line 124). By allowing binary line pressure in the main supply line 126, half the pump 118 may be unloaded thus reducing pump losses and improving fuel economy.

The actuator feed limit valve 134 is connected between the main supply line 126 and the solenoid feed line 152. The actuator feed limit valve 134 limits the maximum pressure of the hydraulic fluid supplied to the solenoid feed line 152 by selectively closing a direct connection between the main supply line 126 and the solenoid feed line 152 and forcing the main supply line 126 to communicate with the solenoid feed line 152 through a flow restriction orifice 153.

The ratio control subsystem 104 includes the ratio control valve 136 as well as a trunnion piston 160, a precess cam 162, and a stepper motor 164. The ratio control valve 136 is actuated by the stepper motor 164. The ratio control valve 136 receives pressurized hydraulic fluid from the main supply line 126 and diverts fluid to each side of the trunnion piston 160. Accordingly a pressure differential is created across the trunnion piston 160 which in turn drives the trunnion piston 160 in a linear direction. Translation of the trunnion piston 160 correlates to movement of a power roller (not shown) in the CVT which varies the output or gear ratio of the CVT. The movement of the power roller in turn correlates to the movement of the precess cam, which moves the lever that's connected to the valve 136 and stepper motor 164 as a ratio feedback mechanism. When the actual speed ratio of the CVT matches the commanded ratio, the ratio control valve 136 returns to a balanced position and the ratio is maintained. It should be appreciated that the precess cam 162, the ratio control valve 136, and the stepper motor 164 can be connected by different mechanism without departing from the scope of the present invention.

The TCC subsystem 106 includes the TCC regulator valve 138, a converter feed valve 170, and a TCC enable valve 172. The TCC regulator valve 138 includes ports 138A-F. Port 138A communicates with a signal line 174. Port 138B communicates with the main supply line 126. Port 138C communicates with the main supply line 178. Ports 138D and 138F are in communication with a TCC feed line 180. Port 138E is an exhaust port that communicates with the sump 114 or an exhaust backfill circuit.

The TCC regulator valve 138 further includes a spool 182 slidably disposed within a bore 184. The spool 182 is biased to a first position (i.e. de-stroked) by a spring 186. In the first position, port 138B communicates with port 138C but is prevented from communicating with port 138D. Instead, port 138D communicates with the exhaust port 138E. The spool 182 is stroked to a second position against the bias of the spring 186 by a TCC regulation solenoid 188 that communicates with the signal line 174. The TCC regulation solenoid 188 receives hydraulic fluid from the solenoid feed line 152 and is preferably a normally low, low flow variable force solenoid. The solenoid 188 commands a fluid pressure by sending pressurized hydraulic fluid to port 138A to act on the spool 182, thereby stroking the spool 182 to the second position. In the second position port 138B communicates with port 138D thereby connecting the main supply line 126 with the TCC feed line 180. Feedback pressure through port 138F acts on the spool 182 against the signal pressure from the solenoid 188. It should be appreciated that solenoid 188 and valve 138 can become a single high flow, normally low variable force solenoid without departing from the scope of the present invention.

The converter feed valve 170 limits the maximum pressure of hydraulic fluid to the torque converter control subsystem 106 and the lubrication control subsystem 108. While the converter feed valve 170 is illustrated and described as a pressure control valve it should be appreciated that the converter feed valve 170 may be a flow control valve without departing from the scope of the present invention. The converter feed valve 170 includes ports 170A-E. Port 170A is an exhaust port that communicates with the sump 114 or an exhaust backfill circuit. Ports 170B and 170D are in communication with the fluid line 142. Ports 170C and 170E are in communication with a lube feed line 190.

The converter feed valve 170 further includes a spool 192 slidably disposed within a bore 194. The spool 192 automatically changes position to restrict flow from port 170D to port 170C until a pressure balance is achieved across the spool 192. The spool 192 is modulated by a spring 196 acting on one end of the spool 192 and by hydraulic fluid providing feedback pressure through port 170E on an opposite end of the spool 170.

The TCC enable valve 172 includes ports 172A-H. Port 172A communicates with a Reverse signal line 200. Port 172B communicates with a TCC feed line 202. Ports 172C and 172D communicate with the feed line 190. Port 172E communicates with a cooler line 208. Port 172F communicates with a clutch feed line 210. The clutch feed line 210 communicates with a TCC clutch 204 of a torque converter 206 and with a blow off valve 211. Port 172G communicates with the TCC feed line 180. Port 172H communicates with a signal line 212.

The TCC enable valve 172 includes a spool 214 slidably disposed within a bore 216. The TCC enable valve 172 is controlled by a TCC enable solenoid 218 that communicates with the signal line 212. The TCC enable solenoid 218 receives hydraulic fluid from the solenoid feed line 152 and is preferably a normally low on/off solenoid. The TCC enable solenoid 218 toggles the spool 214 between an "on" and "off" state. In the "off" state the TCC enable valve 172 may be fed with reverse oil through port 172A to lock out the TCC clutch 204 when the CVT is in Reverse. When the TCC enable valve is in the "off" state, port 172C communicates with port 172B and port 172E communicates with port 172F. The TCC enable valve 172 receives converter feed fluid at port 172C from the converter feed valve 170 and feeds the converter feed fluid through port 172C and into the torque converter 206. The hydraulic fluid flows through the torque converter 206 and out the fluid line 210 to enter back into the TCC enable valve 172 via port 172F. The TCC enable valve 172 then directs the fluid into a cooler 220 via port 172E and cooler line 208. The cooler circuit 220 feeds compensator feed and gearbox lube.

The TCC clutch 204 can only be applied when the TCC enable valve 172 is in the "on" state. To engage the TCC clutch 204, first the TCC enable valve 172 is moved to the "on" position by the TCC enable solenoid 218 which sends a pressure signal to the spool 214 via signal line 212. The spool 214 then strokes against a spring 222 to the "on" state. In this position port 172D communicates with port 172E and port 172G communicates with port 172F. In addition to activating the TCC enable solenoid 218 the TCC regulation solenoid 188 is activated in order to stroke the TCC regulator valve 138. The TCC regulator valve 138 feeds pressurized oil to port 172G of the TCC enable valve 172 via feed line 180. The TCC enable valve 172 directs the pressurized fluid from port 172G to the clutch 204 of the torque converter 206. The oil flows through the converter 206 and is exhausted out of the TCC enable valve 172. In addition, when in the "on" state, the TCC enable valve 172 receives converter feed oil at port 172D and directs the fluid into the cooling circuit 220 that eventually provides oil to the compensator feed circuit and to the gearbox lube circuit.

The lubrication control subsystem 108 uses an active lubrication control valve 230 to direct converter feed oil from the converter feed valve 170 to a high speed gear lube circuit 232 and a variator lube circuit 234. In an alternate embodiment, the converter feed valve 170 is removed or moved downstream into the feed line 190 between the TCC enable valve 172 and the pressure regulator valve 132 such that port 230D of the active lubrication valve directly communicates with port 132B of the pressure regulator valve. The active lubrication control valve 230 includes ports 230A-E. Port 230A communicates with a signal line 236. Port 238B communicates with the sump 114 or an exhaust backfill circuit. Port 230D communicates with the feed line 190. Ports 230C and 230E communicate with a lube line 231. The lube line 231 communicates with the feed line 190 through a flow restriction or bypass orifice 233 and with the high speed gear lube circuit 232 through a flow restriction orifice 235 and with the variator lube circuit 234 through a flow restriction orifice 237. Therefore the bypass orifice 233 communicates on a first end with port 230C and lube line 231 and communicates on an opposite or second end with feed line 190.

The active lubrication control valve 230 further includes a spool 240 slidably disposed within a bore 242. The spool 240 is biased to a first position (i.e. de-stroked) by a spring 244. In the first position, port 230D is closed off thereby forcing oil from the converter feed limit valve 170 to communicate through the bypass orifice 233, thereby reducing lubrication oil flow to the high speed gear lube circuit 232 and the variator lube circuit 234. The bypass orifice 233 assures a minimum amount of oil flow to the lubrication circuits 232, 234 even if the spool 240 is in the first position. The spool 240 is stroked to a regulating position against the bias of the spring 244 by a lubrication control solenoid 248 that communicates with the signal line 236. The lubrication control solenoid 248 receives hydraulic fluid from the solenoid feed line 152 and is preferably a normally high, low flow variable force solenoid. The solenoid 248 commands a fluid pressure by sending pressurized hydraulic fluid to port 230A to act on the spool 240, thereby stroking the spool 240 to the regulating position. In the regulating position port 230D communicates with port 230C thereby connecting the feed line 190 with the lube line 231. Feedback pressure through port 230E acts on the spool 240 against the signal pressure from the solenoid 248, to allow the valve to regulate a pressure. It should be appreciated that valve 230 can be a flow control valve instead of a pressure control valve.

The variator control subsystem 110 includes a clamping control solenoid 250 and a regulator valve 252. The solenoid 250 receives hydraulic fluid from the solenoid supply line 152 and is connected to a signal line 254. The regulator valve 252 is fed oil from the feed line 178 and is connected to the signal line 254 and to disc loader feed line 256. The clamping control solenoid 250 is preferably a low flow, normally high variable flow solenoid. The solenoid 250 selectively communicates the oil to the signal line 254 in order to move the regulator valve 252. The regulator valve 252 in turn selectively communicates the oil from the feed line 178 to the actuator feed line 256. The actuator feed line 256 communicates with a variator clamping actuator 258. It should be appreciated that solenoid 250 and valve 252 can become a single high flow, normally high variable force solenoid without departing from the scope of the present invention.

The clutch control subsystem 112 controls engagement of a Drive clutch actuator 260 and a Reverse clutch actuator 262. The Drive clutch actuator 260 and the Reverse clutch actuator 262 are controlled by a solenoid valve assembly 270 and a manual valve 272. The solenoid valve assembly 270 includes a clutch control solenoid 274 and a regulator valve 276. The solenoid 274 receives hydraulic fluid from the solenoid supply line 152 and is connected to a signal line 278. The regulator valve 276 is fed oil from a feed line 178. The regulator valve 276 is also connected to a feed line 282. The clutch control solenoid 274 is preferably a low flow, normally high variable flow solenoid. The solenoid 274 selectively communicates the oil to the signal line 278 in order to move the regulator valve 276. The regulator valve 276 in turn selectively communicates the oil from the feed line 280 to the feed line 282. It should be appreciated that solenoid 275 and valve 276 can become a single high flow, normally high variable force solenoid without departing from the scope of the present invention.

The manual valve 272 communicates with the feed line 282, the Reverse line 200, and with a Drive line 284. Movement of a range selector of an operator of the motor vehicle in turn translates the manual valve 272 between various positions including a Reverse position and a Drive position. In the Drive position, the feed line 282 communicates with the Drive line 284. In the Reverse position the feed line 282 communicates with the Reverse feed line 200. The Drive feed line 282 communicates with the Drive clutch actuator 258 while the Reverse feed line 200 communicates with the Reverse clutch actuator 262, as well as the TCC enable valve 172.

The clutch control solenoid 274 sends a signal to the clutch regulator valve 276 to command a clutch pressure. The clutch regulator valve 276 is fed by line pressure and sends the clutch pressure to the manual valve 272 via the feed line 282. The manual valve 272 can feed the clutch oil to the Drive clutch actuator 260, the Reverse clutch actuator 262, or to no clutches. During a Drive clutch exhaust a check ball 290 blocks a fill orifice 291 and the Drive clutch can exhaust through only an exhaust orifice 293. Likewise, during a Reverse clutch exhaust, a check ball 294 blocks a fill orifice 295 and the Reverse clutch can exhaust through only an exhaust orifice 296. It should be appreciated that other orifice and check ball arrangements can be used without departing from the scope of present invention, including a single orifice for fill and exhaust, or filling through a single orifice and exhausting through two orifices.

The description of the invention is merely exemplary in nature and variations that do not depart from the general essence of the invention are intended to be within the scope of the invention. Such variations are not to be regarded as a departure from the spirit and scope of the invention.

The following is claimed:

1. A system comprising:
   a source of pressurized hydraulic fluid;
   a control valve assembly having an inlet, an outlet, and a spool moveable between a first position and a second position, wherein the inlet is in downstream fluid communication with the source of pressurized hydraulic fluid, and wherein spool prevents fluid communication from the inlet to the outlet when in the first position and wherein the spool allows fluid communication from the inlet to the outlet when in the second position;
   a bypass orifice having a first end in fluid communication with the outlet and a second end in fluid communication with the source of pressurized hydraulic fluid;
   a lubrication feed line in communication with the outlet and the first end of the bypass orifice; and
   a variator lubrication circuit in downstream fluid communication with the lubrication feed line.

2. The system of claim 1 further comprising a control solenoid in direct fluid communication with the spool of the control valve, wherein the control solenoid controls the amount of fluid communication between the inlet and the outlet by communicating a pressurized hydraulic fluid signal to act on the spool to move the spool between the first and second positions.

3. The system of claim 2 wherein the control solenoid is a normally high, low flow variable force solenoid.

4. The system of claim 2 wherein the control valve assembly includes a signal port that communicates with a first end of the spool, and wherein the control solenoid is in direct fluid communication with the signal port.

5. The system of claim 4 wherein the control valve assembly includes a feedback port that communicates with a second end of the spool opposite the first end, and wherein the feedback port is in communication with lubrication feed line.

6. The system of claim 5 further comprising a high speed gear lubrication circuit in downstream fluid communication with the lubrication feed line.

7. The system of claim 1 wherein the source of pressurized hydraulic fluid includes a pump in upstream fluid communication with a pressure regulator valve assembly, and wherein the inlet is in direct fluid communication with the pressure regulator valve assembly.

8. The system of claim 7 wherein the pump includes a first outlet and a second outlet, wherein the first outlet communicates with the control valve assembly through the pressure regulator valve assembly.

9. The system of claim 8 wherein the pressure regulator valve assembly includes a first port, a second port, a third port, and a pressure regulator spool moveable between a first position, a second position, and a third position, wherein the first port is in fluid communication with the first outlet of the pump, the second port is in fluid communication with the inlet of the control valve assembly, and the third port is in fluid communication with a suction line, and wherein the pressure regulator spool prevents fluid communication from the first port to the second port and to the third port when in the first position, wherein the pressure regulator spool allows fluid communication between the first port and the second port and prevents fluid communication between the third port and the first port when in the second position, and wherein the pressure regulator spool allows fluid communication between the first port and the second port and the third port when in the third position.

10. The system of claim 9 wherein the suction line communicates with a first and a second inlet of the pump.

11. The system of claim 10 further comprising a ratio control subsystem in direct downstream fluid communication with the second outlet of the pump.

12. The system of claim 11 wherein the ratio control subsystem includes a ratio control valve, a trunnion piston, a precess cam, and a stepper motor.

13. The system of claim 10 wherein the spool of the control valve assembly is in the first position when the pressure regulator spool is in the second position.

14. An active lubrication control system for a continuously variable transmission comprising:
   a source of pressurized hydraulic fluid;
   a ratio control subsystem in downstream fluid communication with the source of pressurized hydraulic fluid;
   a control valve assembly having an inlet, an outlet, and a spool moveable between a first position and a second position, wherein spool prevents fluid communication from the inlet to the outlet when in the first position and wherein the spool allows fluid communication from the inlet to the outlet when in the second position;
   a variator lubrication circuit;
   a feed line connected from the source of pressurized hydraulic fluid to the inlet of the control valve assembly;
   a lubrication line connected from the outlet of the control valve assembly to the variator lubrication circuit; and
   a bypass orifice connecting the feed line to the lubrication line.

15. The system of claim 14 further comprising a control solenoid in direct fluid communication with the spool of the control valve, wherein the control solenoid controls the amount of fluid communication between the inlet and the outlet by communicating a pressurized hydraulic fluid signal to act on the spool to move the spool between the first and second positions.

16. The system of claim 14 further comprising a high speed gear lubrication circuit connected to the lubrication line.

17. The system of claim 14 wherein the source of pressurized hydraulic fluid includes a pump in upstream fluid communication with a pressure regulator valve assembly, and wherein the pump includes a first outlet and a second outlet, wherein the first outlet communicates with the control valve assembly through the pressure regulator valve assembly and wherein the second outlet communicates with the ratio control subsystem.

18. The system of claim 17 wherein the pressure regulator valve assembly includes a first port, a second port, a third port, and a pressure regulator spool moveable between a first position and a second position, wherein the first port is in fluid communication with the first outlet of the pump, the second port is in fluid communication with the feed line, and the third port is in fluid communication with a suction line, and wherein the pressure regulator spool prevents fluid communication from the first port to the second port and third port when in the first position and allows fluid communication between the first port and the second port and third port when in the second position.

19. The system of claim 18 wherein the pressure regulator spool is moveable to a third position between the first and second positions, wherein the pressure regulator spool allows fluid communication from the first port to the second port and prevents fluid communication from the first port to the third port when in the third position.

* * * * *